United States Patent [19]

Abu-Isa et al.

[11] Patent Number: 5,013,089
[45] Date of Patent: May 7, 1991

[54] THIN PROFILE INTEGRATED SUSPENSION AND SEAT TRIM COVER

[75] Inventors: Ismat A. Abu-Isa, Rochester; Susan C. Moran, Fraser; Michael A. Roy, Troy, all of Mich.

[73] Assignee: General Motors Corporation, Detroit, Mich.

[21] Appl. No.: 567,590

[22] Filed: Aug. 15, 1990

Related U.S. Application Data

[63] Continuation-in-part of Ser. No. 409,556, Sep. 15, 1989, abandoned.

[51] Int. Cl.$^5$ .............................................. A47C 7/02
[52] U.S. Cl. .................................... 297/452; 297/224; 66/190
[58] Field of Search ............... 297/452, 218, 219, 224; 112/440; 66/190, 192, 196; 428/253

[56] References Cited

U.S. PATENT DOCUMENTS 2,251,318  8/1941  Blair et al. .......................... 297/455
4,230,365 10/1980  Messinger ........................... 297/218

Primary Examiner—James R. Brittain
Assistant Examiner—Brian K. Green
Attorney, Agent, or Firm—William A. Schuetz

[57] ABSTRACT

A vehicle seat assembly has a seat frame, and an integrated elastomeric filament suspension and fabric cover in which the elastomeric filaments and yarn for the fabric are knitted together and stretched over the frame to provide a low profile finished seat or back rest which functions both as a suspension and as an aesthetic trim cover.

8 Claims, 4 Drawing Sheets

THIN PROFILE INTEGRATED SUSPENSION AND SEAT TRIM COVER

This application is a continuation-in-part of application Ser. No. 07/409,556, filed Sept. 15, 1989, now abandoned.

The present invention relates to a seat assembly and, more particularly, to a vehicle seat assembly having an elastomeric filament suspension and a fabric cover which are integrated together via knitting to provide a low profile finished seat or back rest cushion.

Current production or traditional vehicle seats usually comprise thick urethane foam buns mounted on semi-flexible wire constructions or stamped metal pans and which are covered with a cut and sewn together trim cover. This makes the seat relatively heavy and with a thick profile such that little room is left beneath the seats.

It has also been proposed to provide thin profile seats for vehicles, including thin seats using elastomeric seat backing material For example, in Blair et al, U.S. Pat. No. 2,251,318, solid rubber tape or strips reinforced by fabric are stretched over a seat frame. As noted in the Blair et al patent, stretched elastomers have good properties for isolation and absorption of impacts and vibrations and readily deform to fit the shape of the body of the occupant they support. A disadvantage of using such conventional elastomers is that they have too low a modulus of elasticity. They will support a person comfortably under static conditions but when a vehicle hits a bump or pothole they stretch causing the seat to deflect and bottom out and then rebound This is presumably the reason the rubber strips in Blair et al were combined with fabric even though that lessens the ability of the strips to conform to the shape of the body of the occupant they support.

In U.S. Pat. No. 4,545,614, assigned to the same assignee as the present invention, a thin profile vehicle seat is disclosed in which a multiplicity of side by side elastomeric filaments made from a block copolymer consisting of polytetramethylene terephthalate polyester and polytetramethylene ether are stretched across a vehicle seat frame The elastomeric filaments had a diameter of between 0.2 and 2 millimeters and the material had a substantially higher modulus of elasticity at 100% elongation than natural rubber and was stretched across the seat frame in the range of 20-100% elongation, preferably 50-75% - elongation in the seat and at least 20% elongation in the back rest. The individual elastomeric filaments conformed to the contour of the body of the occupant and provided a seat which is more comfortable and/or had better ride characteristics than if the elastomers were made from natural rubber strips or the like.

In co-pending application, Ser. No. 194,979, filed May 17, 1988, and assigned to the same assignee, as the present invention, a thin profile seat is disclosed in which elastomeric filaments like that of the 4,545,614 patent are woven together to form a mat. The mat was prestretched in both directions (side-to-side and fore and aft) to at least 5% elongation, preferably between 5-20% elongation, and attached to a seat frame.

The advantage of using the type of filaments disclosed in the '614 patent and the aforementioned co-pending application is that they have a stress-strain curve which tends to plateau in the range of strain between 20-100% elongation. Thus, filaments prestretched in this range or near to this range will provide a good comfort and will easily deflect to adjust to the shape of the occupant. However, with a sudden change of stress, they will stiffen at strains above 100% to support the additional load.

In co-pending application Ser. No. 343,463, filed Apr. 25, 1989, and assigned to the same assignee as the present invention, an improved elastomeric filament for use in seat suspensions is disclosed. It consisted of an oriented elastomeric filament spun from a thermoplastic elastomeric material selected from the group consisting of a block copolymer of polybutylene terephthalate and polytetramethylene glycol, a block copolymer of polybutylene terephthalate/polybutylene isophthalate and polyethylene glycol/polypropylene glycol, a block copolymer of polybutylene terephthalate/polyhexene terephthalate and polytetramethylene glycol, and a block copolymer of polyurethane and polytetramethylene glycol, the mole fraction of the polybutylene terephthalate, polybutylene terephthalate/polybutylene isophthalate and polybutylene terephthalate/polyhexene terephthalate in the block copolymers is less than 0.5, the elastomeric filament is further oriented after the spinning by stretching at temperatures between 20° C. to 120° C. to a draw ratio between 500 to 700 percent elongation such that the oriented filament exhibits a two-stage low tensile modulus and high tensile modulus behavior when tested in accordance with ASTM D-638 tensile test in such a way that the high modulus is at least 2 times greater than the low modulus. This latter two-stage suspension provides for a very comfortable seat assembly even when the vehicle is going over rough road surfaces since the filaments will stiffen up to provide good support.

A disadvantage with the use of the above-noted elastomeric filament suspension systems as disclosed in the afore-mentioned patent and patent applications is that all of these seat assemblies still require the use of a separate trim cover to be applied thereover to both provide a smooth seating surface and to provide for an appealing or aesthetic appearance.

It has also been proposed to provide a seat suspension comprising knitted or woven fabrics that contain elastomeric yarns which are made in much the same way as apparel, such as a woman's tube top, is made in the apparel industry. However, these fabric suspensions are very costly to assemble to a seat frame because the pieces must be cut to size which results in certain material waste and also creates loose elastomeric yarn ends which decreases fabric stability and requires fusing of the ends. In addition, the fabric edges must be reinforced to support hooks that are used for attaching the same to the seat frame. Also, if the frequency of the elastomeric yarn can be controlled to create a variable support fabric, registration requirements will be necessary for cutting prior to fusing and reinforcing the side edges.

In accordance with the provisions of the present invention, a novel seat assembly having an elastomeric filament suspension and a fabric cover are integrated by having the elastomeric filaments and yarn for the fabric knitted together to provide a low profile finished seat or back rest which functions both as a suspension and as an aesthetic trim cover.

Accordingly, a broad object of the present invention is to provide a new and improved seat assembly having an elastomeric filament suspension and a fabric cover which are integrated by having the elastomeric filaments and yarns for the fabric knitted together to provide a low profile finished seat or back rest which functions both as a suspension and as an aesthetic trim cover.

Another object of the present invention is to provide a new and improved seat assembly, such as a vehicle seat assembly, having a seat frame and a low profile seat suspensions stretched across and attached to the frame and in which the seat suspension comprises a mat including first and second knitted layers of yarn each having a looped interlock stitch construction throughout to define laterally spaced longitudinally extending rows of looped stitches, and an elastomeric filament means inserted laterally across the rows of stitches at a predetermined longitudinal frequency and with alternate rows of the stitches being disposed on opposite sides of the elastomeric filament means to prevent any significant displacement of the filament means longitudinally of the mat, the elastomeric filament means being made from a block copolymer material having a diameter between 0.10 to 2.0 millimeters, a high tensile strength and a modulus of elasticity at 100% elongation which is at least a multiple, preferably at least five times that, of natural rubber, and wherein layers are interknitted with each other throughout a central portion of the mat to provide a double knit construction and have knitted side edge portions which are attachable to the seat frame, the mat being prestretched to at least a 5% elongation when attached to the frame whereby the seat suspension mat has a thin profile and functions both as a support and as an aesthetic trim cover.

Yet another object of the present invention is to provide a new and improved vehicle seat assembly having a seat frame and a low profile seat suspension stretched across and attached to the frame, and wherein the seat suspension comprises a mat including first and second knitted layers of fabric yarn each having a looped weft interlock stitch construction throughout to define laterally spaced longitudinally extending rows of looped stitches, and elastomeric filament means continuously inserted laterally across the rows of stitches at a predetermined longitudinal frequency and with alternate rows of the stitches being disposed on opposite sides of the elastomeric filament means to prevent any significant displacement of the filament means longitudinally of the mat, and in which the elastomeric filament means are made from a block copolymer consisting of polytetramethylene terephthalate polyester and polytetramethylene ether material having a diameter between 0.1 to 2.0 millimeters, a high tensile strength and a modulus of elasticity at 100% elongation which is at least five times more than natural rubber, and in which the layers are interknitted with each other throughout a central portion of the mat to provide a double knit construction and are not interknitted with each other for a short distance adjacent their upper and lower side edge portions to define hollow casings which can be readily attached to the seat frame, and in which the mat is prestretched to at least 10% elongation when attached to the seat frame whereby the seat suspension mat has a thin profile and functions both as a support and as an aesthetic trim cover.

Another object of the present invention is to provide a new and improved seat assembly, as defined in the next preceding object and wherein the elastomeric filament means is continuously inserted across the rows of looped stitches and continues into the hollow casing where it is knitted into and becomes part of the casing and changes direction to be inserted in the opposite direction, this insertion being continuously repeated so the elastomeric filament means is never cut at the edges.

A further object of the present invention is to provide a new and improved seat assembly, as defined in the next preceding object, and in which the elastomeric filament means are laterally inserted at different frequencies at different longitudinal locations of the mat to vary the support characteristics of the mat at different locations.

A still further object of the present invention is to provide a new and improved vehicle seat assembly, as defined in the next preceding object, and in which the hollow casings are attached to the frame by sliding the same over elongated members of the frame.

Yet another object of the present invention is to provide a new and improved seat assembly, as defined in the preceding objects and in which the upper and lower side edge portions of the mat are trapped between two adjacent members of the seat frame and with the hollow casings being disposed underneath the mat, and in which elongated attachment means are slidably disposed through the hollow casings and engageable with the adjacent seat frame members to secure the mat in place on the seat frame.

The present invention further resides in various novel constructions and arrangement of parts, and further objects, novel characteristics and advantages of the present invention will be apparent to those skilled in the art to which it relates and from the following detailed description of the illustrated, preferred embodiment thereof made with reference to the accompanying drawings forming a part of this specification and in which similar reference numerals are employed to designate corresponding parts throughout the several views, and in which:

FIG. 7 is a view like that shown in FIG. 5 but showing a further embodiment of attaching the suspension and trim cover to a seat frame;

Figure 1:
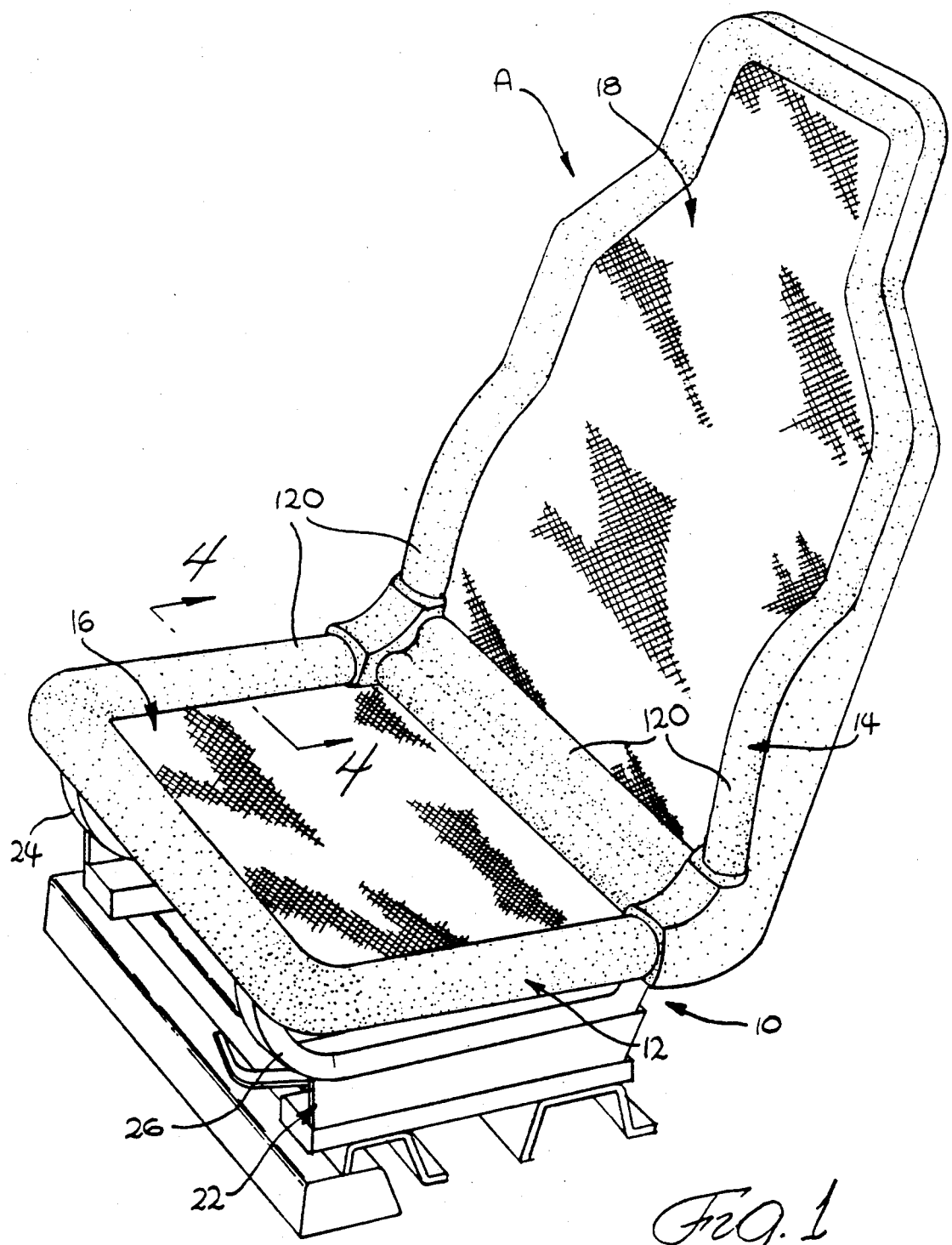
FIG. 1 is a view of a finished seat assembly and showing the combined seat suspension and trim cover secured in place.
Figure 2:
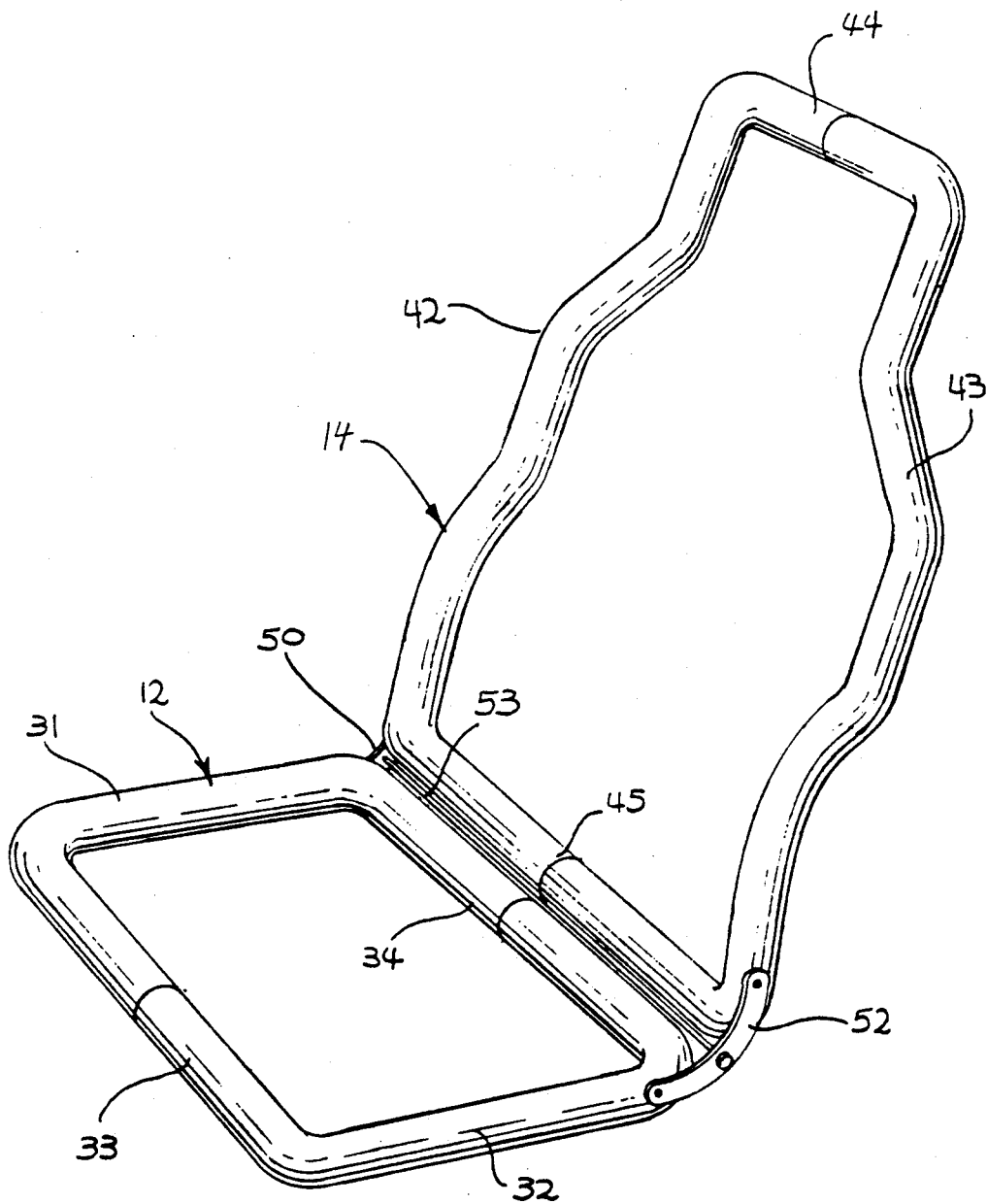
FIG. 2 is a perspective view of part of a seat frame which can be used with the novel seat assembly of the present invention.

Referring to FIGS. 1 and 2 of the drawings, a novel vehicle seat or seat assembly A is thereshown. The seat assembly A comprises, in general, a frame means 10 including a seat frame 12 and a back rest frame 14, an integrated seat suspension and trim cover 16 and an integrated back rest suspension and cover 18.

As best shown in FIGS. 1 and 2, the frame means 10 comprises the upper seat frame 12 and a lower seat frame 22. The lower seat frame 22 could be of any suitable or conventional construction and is hereshown as including a pair of spaced vertically disposed sides 24, 26. The sides 24, 26 are horizontally disposed, as shown by the top end 24a in FIG. 4. The lower frame 22 also includes suitable cross braces (not shown) which can either be welded or detachably secured to the vertically disposed sides 24, 26 and which also have horizontally disposed top ends. The lower seat frame 22 is adapted to be secured to a vehicle floor and can either be permanently mounted thereto or mounted on movable slides attached to the vehicle floor to enable the seat assembly A to be adjusted forward and rearward relative to the vehicle.

The upper seat frame 12 is generally rectangular or square shaped, as best shown in FIG. 2, and preferably is contour shaped, to suit comfort criteria. The upper seat frame 12 is preferably tubular and has left and right generally horizontal sides or side portions 31, 32, a generally horizontal front side or side portion 33 and a generally horizontal rear side or side portion 34. The sides 31, 32, front 33 and rear 34 can either be suitably welded together or can be made in two halves, as indicated by reference numeral 35, and then slidably interconnected to each other in a conventional manner so as to be detachably connected together and then attached to the lower seat frame 22, and in a manner to be hereinafter more fully described.

The frame means 10 also includes a back rest frame 14. The back rest frame is generally rectangular in shape or contoured to the shape shown in FIG. 2 and comprises left and right, tubular generally vertical sides 42, 43 and top and bottom tubular generally horizontal sides 44, 45. The back rest frame 14 adjacent its lower end, as viewed in FIG. 2, is suitable welded or otherwise secured to the seat frame 12 via angle braces 50, 52. The angle braces 50, 52 and cross bar 53 can either fixedly attach back rest frame to the lower seat frame 12 by having the opposite ends of the angle braces 50, 52 welded to the seat and back frames 12, 14, as shown in the illustrated embodiment, or the angle braces 50, 52 could be pivoted to the seat frame so as to allow limited pivotally movement of the back rest frame 14 relative to the seat frame 12, and in a manner well known and conventional in the art. The tubular sides 42, 43 and top and bottom 44, 45, respectively, can either be suitably welded or otherwise secured together or they could be made in two halves and slidably interconnected so as to be attachable and detachable from one another.

The upper seat frame 12 of the seat frame means 10 supports the seat mat 16 and the back rest frame 14 supports the back rest mat 18. Since the seat mat 16 and the back rest mat 18 are constructed in an identical fashion, except for some differences noted hereinafter, only the seat mat 16 will be described in detail and the same reference numerals will be applied to corresponding parts of the back rest mat 18.

Figure 3:
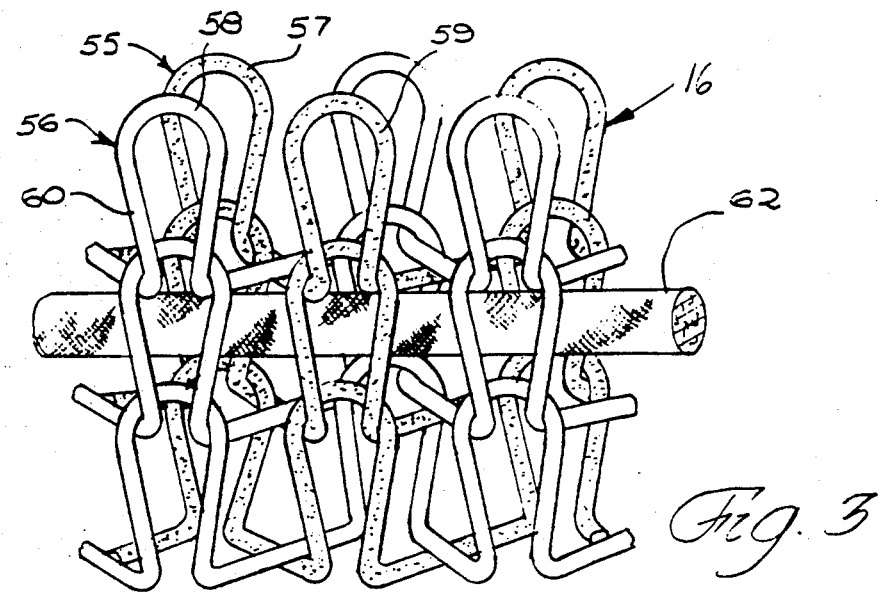
FIG. 3 is an enlarged fragmentary perspective view of the seat suspension and trim cover mat with the seat assembly of the present invention and showing the knit construction of the fabric yarn for the cover and the lateral insertion of the elastomeric filament yarn.

FIG. 3 illustrates in blown up fashion the construction of the seat mat 16. The mat 16 includes first and second knitted layers 55 and 56 of yarn each having a looped weft interlock stitch construction throughout to define laterally spaced longitudinally extending rows 57 and 58 of looped stitches 59 and 60, respectively. The shaded area illustrates the layer 55 of yarn and the white color represents the layer 56 of yarn. The first and second layers 55 and 56 of yarn could be of any suitable fabric yarn material and could be of any color. The mat 16 further includes an elastomeric filament or filament means 62 which is continuously inserted laterally across the rows 57 and 58 of stitches 59 and 60 at a predetermined longitudinal frequency and with alternate rows 57 and 58 of the stitches 59 and 60, respectively, being disposed on opposite sides of the elastomeric filament 62 to prevent any significant displacement of the filament longitudinally of the mat 16.

The elastomeric filament or filament means 62 is preferably made from a block copolymer consisting of polytetramethylene terephthalate polyester and polytetramethylene ether material having a diameter between 0.10 to 2.0 millimeters, and having a high elongation which is at least five times more than natural rubber. Preferably, the elastomeric filaments would be of the composition and have the characteristics noted in copending application Ser. No. 343,463, and assigned to the same assignee as the present invention.

Figure 4:
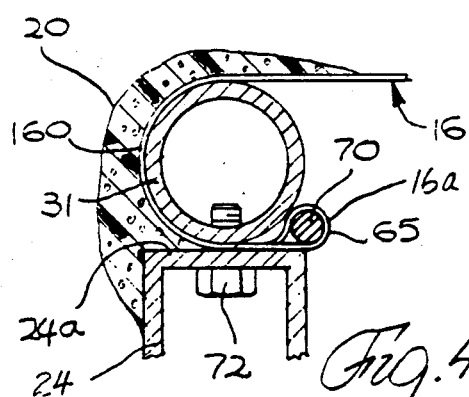
FIG. 4 is a cross sectional view taken approximately along the arrows 4—4 of FIG. 1.
Figure 5:
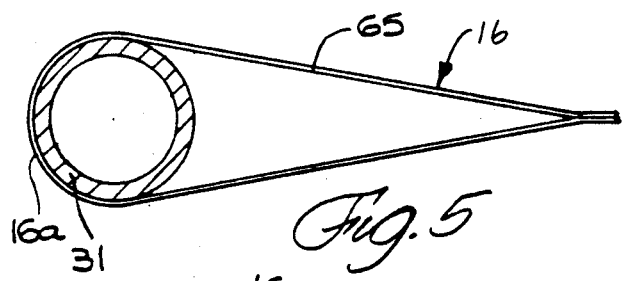
FIG. 5 is an enlarged cross sectional view showing another embodiment for attaching the seat suspension and trim cover to a seat frame.

As shown in FIGS. 3–5, the layers 55 and 56 of yarn would be interknitted with each other throughout a central portion or major portion of the mat 16 to provide a double knit construction, as illustrated in FIG. 3, and would not be interknitted with each other adjacent the side edge portions 16a of the mat 16 so as to define hollow casings 65 which can be readily attached to the upper seat frame 12. The mat 16 is made by being knitted on suitable or commercially available computerized V-bed knitting machines which would be numerically controlled so as to provide a weft interlock stitch. Examples of such commercially available machines are the JET3F machine made and/or sold by the Edouard Dubied & Cie S.A., Couvet, Switzerland, SET 092FF machine made and sold by Shima Seiki Mfg., LTD., 85 Sakata, Wakayama, Japan and machines made and sold by H. Stoll GmbH & Co., Postfach 25 44, D-7410 Reutlingen 1, West Germany. Such machines include adjacently located knitting beds and yarn carriers which traverse the knitting beds longitudinally thereof and with the mat or item being knitted moving vertically downward between the knitting beds. The layers 55 and 56 of the mat 16 are simultaneously knitted by the knitting beds. These machines can be programmed so as to provide a double knit construction, as shown in FIG. 3, throughout a desired lateral width of the machine and then a single knit construction in which the stitches 59, 60 of the layers 55, 56, respectively, are not interlocked with each other at the edge portions 16a of the mat 16. Thus, the layers 55, 56 are separate from each other at the edge portions 16a except that the two layers would be interknitted to each other at the last longitudinally extending row 57, 58 of the stitches at the location remote from the central portion of the mat 16 to define the hollow casings 65. In other words, the knitting beds of the machine simultaneously knits the stitches 59, 60 for each lateral row, as viewed from left to right or vice versa in FIG. 3, as the yarn carriers move longitudinally along the knitting beds. At the center portion of the mat 16 the stitches 59, 60 are interknitted to provide a double knit construction. At the edge portions 16a the stitches 59, 60 are not interknitted together to define a single knit construction for the upper and lower walls of the casing 65, as viewed in FIG. 5. The stitches 59, 60 at the edge portions 16a are only knitted together at the last longitudinally extending row 57, 58 of the stitches to define a hollow casing 65, as viewed in FIG. 5. After a lateral row of stitches 59, 60 is formed, the mat 16 would be moved downwardly an increment so that the next lateral row of stitches 59, 60 for each layer 55, 56 can be formed when the yarn carriers are moved in the reverse direction.

The elastomeric filament 62 is inserted across the machine at a predetermined frequency. When inserted across the machine, the stitches 59, 60 of each layer 55, 56 at the midportion of the mat 16 are simultaneously looped around the filament, as shown in FIG. 3. At the edge portions 16a, the filament 62 is interknitted with either the upper or lower wall of the casing 65, as viewed in FIG. 5. When the filament is reinserted across the machine in the opposite direction, it would be interknitted with the other wall of the casing 65. Thus the filament for each mat 16 is a continuous filament 62 which is interknitted with both the midportion and casings 65 of the mat 16.

In addition, these types of knitting machines enable different parameter shapes in three dimensions of mats to be made, in addition to several aesthetic fabric designs such as, but not limited to, jacquards, twills and prints.

In addition, the frequency of insertion of the elastomeric filament means 62, which would be a continuous filament 62 throughout the mat 16 can be numerically controlled and thus varied. Thus, certain areas of the mat 16 could have a higher number of filaments 62 extending thereacross per centimeter than other areas of the mat 16. The frequency of insertion of the elastomeric filament means 62 will influence the strength and support characteristics of the final mat. In other words, variable support characteristics can be accomplished in the mat by programming the machine to vary the frequency of insertion of the elastomeric filament means 62. This is an important advantage in that the suspension mat 16 can be tuned or designed to have the comfort level desired.

It should also be noted that the weft looped interlocked stitch, shown in FIG. 3, also prevents the elastomeric filament means 62 from any significant shifting longitudinally of the mat 16 (from shifting vertically as viewed in FIG. 3 of the drawings) and thus traps the filament means 62 in place.

In the embodiment of the seat mat 16 shown in FIGS. 1-5, the double knit construction would be employed throughout the seat portion of the mat 16 and the single knit construction defining the hollow casings 65 may be employed adjacent the four sides of the mat 16. As best shown in FIG. 1, the mat 16 would be prestretched laterally to at least 5% elongation, but preferably to at least a 10% elongation, prior to being attached to the frame 12. As noted in the above-identified prior patents and patent applications of the assignee of the present invention, this prestretch provides good seating comfort and the mat will deflect to adjust to the shape of the occupant. However, with sudden change of stress, e.g. when the vehicle goes over a bump, it will stiffen at strains above 20% elongation to support the additional load.

The seat mat 16 will be attached to the frame 12, in the preferred embodiment, in the manner illustrated in FIG. 4. As thereshown, the seat mat 16 is stretched and with the hollow casing 65 pulled around the outside of the tubular side 31. A suitable rod 70 would be inserted in the hollow casing 65 which would engage the tubular side 31 and the top side 24a of the side 24 of the lower frame 22 when the upper frame 12 is laid against the top 24a thereof. The mat 16 could be secured in place by suitable bolts 72 which extend upwardly through the top 24a of the side 24 and through suitable threaded openings in the tubular side 31. The seat mat 16 would be first stretched across the upper seat frame 12 side to side and secured in place by the rods 70 and bolts 72, as shown in FIG. 4, and then the seat mat 16 would be stretched taut front to rear over the front and rear sides 33 and 34 and secured in place to the cross braces (not shown) of the lower seat frame 22, and in the same manner as noted immediately above. The mat can also be attached first to a frame consisting of two halves, and then the two halves of the frame are separated mechanically and slidably interconnected, and then the remaining frame members such as 24 and cross braces (not shown) are bolted on to hold the tensioned mat 16 and frame in place.

Figure 9:
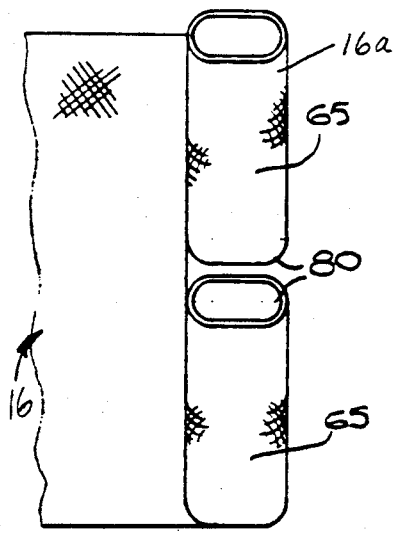
FIGS. 9–13 show mats made in accordance with the present invention, but having different upper and lower side edge portions, which illustrate design flexibility when bolts or other fasteners are to be employed.
Figure 10:
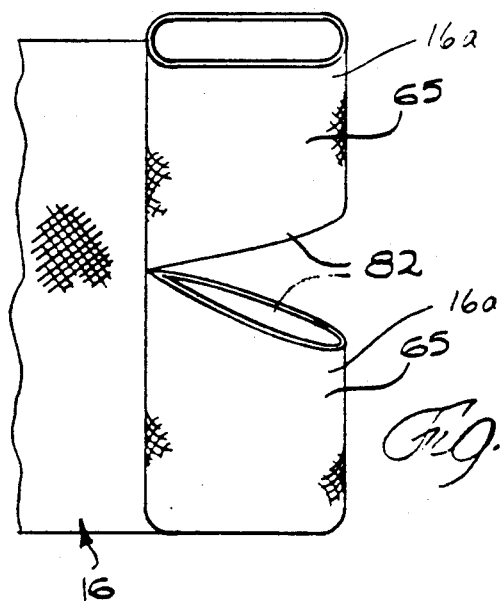

FIGS. 5-8 show alternate embodiments for attaching the hollow casings 65 of the seat mat 16 to the upper seat frame means 12. As shown in FIG. 5, the hollow casings 65 could be slid over the longitudinal length of the tubular frame portions 31-34 after the mat 16 is prestretched. To enable the tube portions 31-34 to be slid within the casings 65, the side portions of the casing could be split, as indicated by reference numeral 80 in FIG. 9, or made wedge-shaped, as indicated by reference numeral 82 in FIG. 10, so as to enable the tubular supports 31-34 to be inserted into the adjacent casings 65 and with the tubular supports then being slidably connected together in a conventional manner. The embodiments of FIGS. 9 and 10 can also be used with bolts and have other holes to enable suitable fasteners to be attached thereto.

Figure 6:
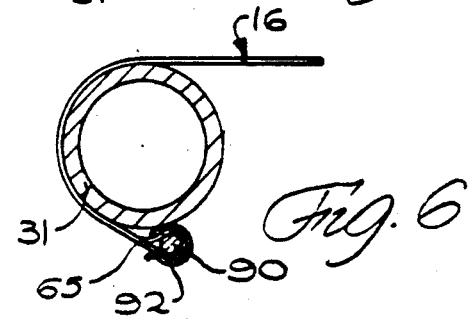
FIG. 6 is a view like that shown in FIG. 5 but showing yet another embodiment of attaching the suspension and trim cover to a seat frame.

FIG. 6 shows connecting the seat suspension mat 16 to the tubular frame 12 by inserting a rod 90 through the casing 65 and then stretching the mat 16 and placing the ends of the rod within clips 92 welded or otherwise secured to the tubular frame 12.

Figure 7:
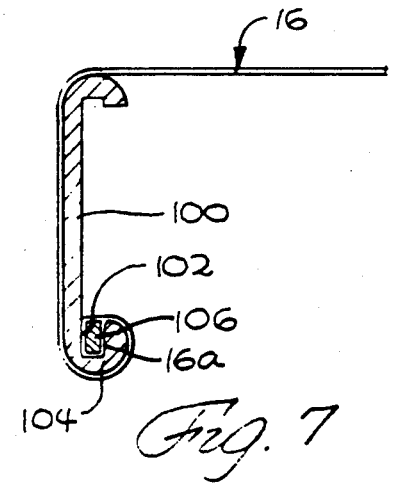
FIG. 7 is a view like that shown in FIG. 5 but showing yet another further embodiment of attaching the suspension and trim cover to a seat frame.
Figure 8:
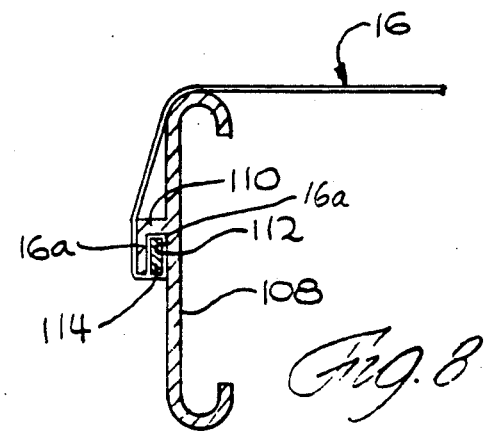
FIG. 8 is a view like that shown in FIG. 5 but showing yet another embodiment of attaching the suspension and trim cover to a seat frame.

FIG. 7 shows a seat frame having four sides 100 (only one of which is shown in cross-section) which define a rectangle. Each side comprises a stamped frame part which is generally C-shaped to define a recess 102 at its lower inner end 104. In this construction the seat mat 16 would be stretched over the stamped frame and curled around its outer side edge and then inserted within the recess 102 and held in place by a suitable strap or wedge 106. FIG. 8 is similar to that shown in FIG. 7 except that the side frame 108 is provided with a downwardly extending inverted L-shaped part 110 which defines a downwardly facing recess 112 and with the seat mat 16 being stretched over the frame 108 and then inserted into the recess 112 and held in place by a strap or wedge 114.

Figure 12:
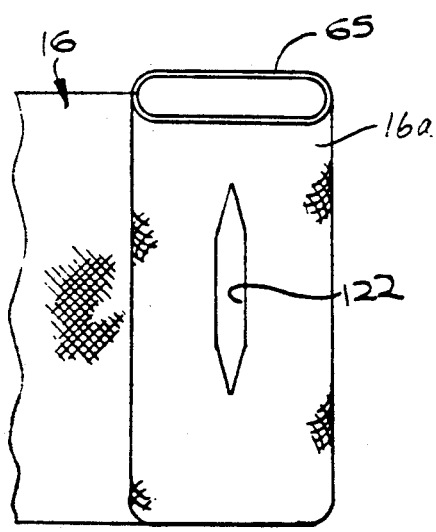
Figure 11:
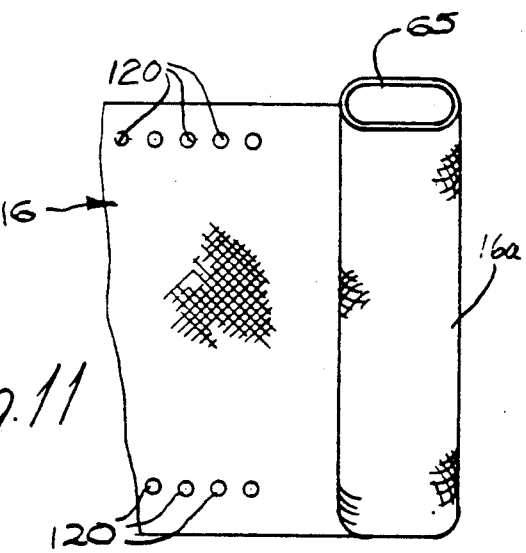
Figure 13:
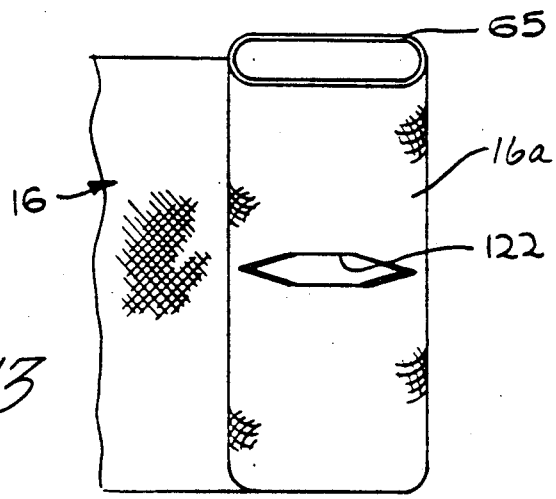

FIGS. 11-13 show knitted mats 16 which are provided with a plurality of button holes 120 (FIG. 11) or slots 122 (FIGS. 12 and 13) to enable suitable hooks or bolts (not shown) to attach the mat 16 to a side frame.

An important advantage of the present invention is that the elastomeric filament means 62 provides a seat suspension which is very comfortable to sit on, which will not bottom out when the vehicle encounters rough road surface or goes over a bump so that it provides a good suspension support. At the same time, the knitted fabric yarn encapsulating and holding the elastomeric filaments in place provides an aesthetic trim cover so that the entire seat assembly, i.e., suspension mat and trim cover can be integrated and made as one part and then be readily assembled onto a seat frame. This eliminates the need for separate trim covers. Further, the novel mat 16 is of a thin profile.

As shown in FIGS. 1 and 4, additional padding 120 surrounding the tubular frame means 12 and 14 could be added to the seat and back rest suspension if desired. This padding would surround the seat and back rest frames and be adhesively and/or mechanically secured thereto.

Although the illustrated embodiments hereof have been described in great detail, it should be apparent that certain modifications, changes and adaptations may be made in the illustrated embodiments, and that it is intended to cover all such modifications, changes and adaptations which come within the spirit of the present invention.

The embodiments of the invention in which an exclusive property or privilege is claimed are defined as follows:

1. A seat assembly, such as a vehicle seat assembly, having a seat frame and a low profile seat suspension stretched across and attached to the frame, the improvement being that said seat suspension comprises a mat including first and second knitted layers of yarn each having a looped interlock stitch construction throughout to define laterally spaced longitudinally extending rows of looped stitches,
   elastomeric filament means inserted laterally across said rows of stitches at a predetermined longitudinal frequency and with alternate rows of said stitches being disposed on opposite sides of said elastomeric filament means to prevent any significant displacement of said filament means longitudinally of said mat,
   said elastomeric filament means being made from a block copolymer material having a diameter between 0.10 to 2.0 millimeters, a high tensile strength and a modulus of elasticity at 100 percent elongation which is at least twice that of natural rubber,
   said layers being interknitted with each other throughout a central portion of said mat to provide a double knit construction and having knitted side edge portions which are attachable to said seat frame, said mat being prestretched to at least 5% elongation when attached to said frame whereby said seat suspension mat has a thin profile and functions both as a support and as an aesthetic trim cover.

2. A seat assembly, such as a vehicle seat assembly, having a seat frame and a low profile seat suspension stretched across and attached to the frame, the improvement being that said seat suspension comprises a mat including first and second knitted layers of yarn each having a looped weft interlock stitch construction throughout to define laterally spaced longitudinally extending rows of looped stitches,
   an elastomeric filament means continuously inserted laterally across said rows of stitches at a predetermined longitudinal frequency and with alternate rows of said stitches being disposed on opposite sides of said elastomeric filament means to prevent any significant displacement of said filament means longitudinally of said mat,
   said elastomeric filament means being made from a block copolymer consisting of polytetramethylene terephthalate polyester and polytetramethylene ether material having a diameter between 0.10 to 2.0 millimeters, a high tensile strength and a modulus of elasticity at 100 percent elongation which is at least five times more than natural rubber,
   said layers being interknitted with each other throughout a central portion of said mat to provide a double knit construction and not being interknitted with each other for a short distance adjacent their side edge portions to define hollow casings which can be readily attached to said seat frame, said mat being prestretched to at least 10% elongation when attached to said frame whereby said seat suspension mat has a thin profile and functions both as a support and as an aesthetic trim cover.

3. A seat assembly, such as a vehicle seat assembly, having a seat frame and a low profile seat suspension mat stretched across and attached to the frame, the improvement being that said seat suspension comprises a mat including first and second knitted layers of yarn each having a loosely looped weft interlock stitch construction throughout to define laterally spaced longitudinally extending rows of looped stitches,
   elastomeric filament means inserted laterally across said rows of stitches and with alternate rows of said stitches being disposed on opposite sides of said elastomeric filament means to prevent any significant displacement of said filament means longitudinally of said mat, said elastomeric filament means being laterally inserted at different frequencies at different longitudinally spaced locations of said mat to vary the support characteristics of the mat at different locations,
   said elastomeric filament means being made from a block copolymer consisting of polytetramethylene terephthalate polyester and polytetramethylene ether material having a diameter between 0.10 to 2.0 millimeters, a high tensile strength and a modulus of elasticity at 100 percent elongation which is at least five times more than natural rubber,
   said layers being interknitted with each other throughout a central portion of said mat to provide a double knit construction and being knitted adjacent their side edge portions so as to be attachable to said seat frame, said mat being prestretched to at least 10% elongation when attached to said frame whereby said seat suspension mat has a thin profile and functions both as a support and as an aesthetic trim cover.

4. A seat assembly, as defined in claim 2, and wherein said hollow casings are attached to said frame by sliding the hollow casings over elongated members of said frame.

5. A seat assembly, as defined in claim 4, and wherein the seat frame comprises two halves, and wherein the casings at opposite sides of the mat are attached to one of the frame halves by sliding the same thereover, and in which the frame halves are relatively moved away from each other to a position so that the mat is prestretched said desired amount and are then secured in place.

6. A seat assembly, as defined in claim 2, and wherein said mat adjacent its side edge portions is sandwiched between two adjacent members of said seat frame and with the hollow casings being disposed underneath said mat, and elongated attachment means slidably through said hollow casings and engageable with said adjacent seat frame members to secure the mat in place on said seat frame.

7. A seat assembly, as defined in claim 3, and wherein said layers adjacent said side edge portions being wrapped around support frame members, and means for attaching said side edge portions in place on said support frame after being wrapped around said support frame members.

8. A seat assembly, as defined in claim 7, and wherein said side edge portions are knitted so as to have openings therethrough for use in attaching the mat to the seat support frame.

* * * * *